United States Patent [19]

Mookherjee

[11] Patent Number: 5,136,805
[45] Date of Patent: Aug. 11, 1992

[54] TRANSPARENT CONTAINER CONTAINING LIVING FLOWER

[75] Inventor: Braja D. Mookherjee, Holmdel, N.J.

[73] Assignee: International Flavors & Fragrances Inc., New York, N.Y.

[21] Appl. No.: 810,074

[22] Filed: Dec. 19, 1991

[51] Int. Cl.[5] ............................................. A01G 9/14
[52] U.S. Cl. ......................................... 47/69; 47/1.01
[58] Field of Search ................................. 47/69, 1.01

[56] References Cited

U.S. PATENT DOCUMENTS

| | | | |
|---|---|---|---|
| 2,155,811 | 4/1939 | Tredup | 47/69 |
| 2,807,901 | 10/1957 | Gilowitz | 47/69 |
| 3,269,578 | 8/1966 | Lewis | 47/69 |
| 3,320,697 | 5/1967 | Larsen | 47/69 |
| 4,248,347 | 2/1981 | Trimbee | 47/69 |
| 4,811,841 | 3/1989 | Domenichiello | 47/69 |

FOREIGN PATENT DOCUMENTS

3128315 6/1990 Japan .

Primary Examiner—Richard E. Chilcot, Jr.
Assistant Examiner—Joanne C. Downs
Attorney, Agent, or Firm—Arthur L. Liberman

[57] ABSTRACT

Described is an air-tight flexible transparent container containing at least one living flower immersed in an aqueous suspension. The article is useful (i) for display purposes; and/or (ii) for analysis of the head space in the container above the living flower when the container is fitted with a tube effecting communication of the internal 3-space (internal volume) of the container with outside analytical means and/or (iii) for aromatizing the environment surrounding the container when the container is fitted with a wick effecting communication of the internal 3-space (internal volume) of the container with the environment surrounding the container.

1 Claim, 7 Drawing Sheets

TRANSPARENT CONTAINER CONTAINING LIVING FLOWER

BACKGROUND OF THE INVENTION

My invention concerns an air-tight flexible transparent container containing one or more living flowers which are immersed in an aqueous suspension, e.g., water or a hydroponic solution of water and plant nutrients.

Uses of aromas evolved from living flowers are highly sought after in the perfumery art. Great difficulty has been experienced in attempting to capture and reproduce actual aroma ingredients of the living flower.

In addition, a need has arisen for observation of the growth of living flowers in nutrient media (e.g., "hydroponic" growth) and, according, a need for a system displaying such growth and for observing such growth has arisen.

The use of flexible containers containing plants which are in their growth cycles is known in the prior art. Thus, published Japanese Patent Application J03/128315 published on Jun. 30, 1990 is as follows:

---

SIRA/* D21 91-203969/28 *J0 3128-315-A

Bathing agent- comprises sealing water-soluble or -dispersible bathing agent and insol. plant in water permeable bag
SIRAISHI T 01.07.89-JP-170014 (30.06.90-JP-173675)
(31.05.91) A61k-07/50
30.06.90 as 173675 (31MJR)
A new bathing agent is made by sealing a bathing agent compsn., consisting of a water-sol. and/or water-dispersible bathing agent compsn. and dried, and water-insol. plants in a water-insol. water-permeable bag so that sol. ingredients penetrate through the bag, but not the plants.
USE- For providing an agent exerting bathing effects of the agents and plants efficiently and cleanly. (9 pp Dwg. No. 0/11)
C91-088497

---

Nothing however, in the prior art has been discovered which covers the utilization and fabrication of the article of my invention.

SUMMARY OF THE INVENTION

My invention is drawn to a transparent container containing at least one living flower. More specifically, my invention is drawn to an air-tight flexible transparent container containing at least one living flower immersed in an aqueous suspension. The flexible transparent container may be fabricated from transparent polyethylene, polypropylene or polyester, e.g., the polyester formed from the reaction of ethylene glycol and phthalic anhydride having a molecular weight of between one million and two million. The thickness of the transparent polymer may vary from 0.001 mm up to about 0.2 mm. The living flower or living flowers may be the same or different and may be, for example, living roses, geraniums, violets, daisies, lilacs and lilies. The aqueous suspension may be water but preferably is a "hydroponic" nutrient medium consisting of water, minerals and other nutrient materials well known to those having ordinary skill in the art.

The internal volume of the container may vary from about 0.5 cubic feet up to about 5 cubic feet. The dimensions of the container, in the event that it is conical in shape and having a lower spherical surface may vary from about 0.5 feet in radius up to about 1 foot in radius and from about 0.5 feet in height up to about 2 feet in height. The dimensions may be relatively lesser than those set forth above or relatively greater than those set forth above as desired and as necessary.

The article is useful (i) for display purposes and/or (ii) for analysis of the head space in the container above the living flower when the container is fitted with a thin tube (e.g., 0.05 mm in internal diameter) effecting communication of the internal 3-space (internal volume) of the container with out side analytical means (e.g., GC-MS spectrographs and the like) and/or (iii) for aromatizing the environment surrounding the container (e.g., with rose aromas or other floral aromas, (e.g., jasmine) when the container is fitted with a wick (e.g., fabricated of, for example, microporous polyurethane foam) effecting communication of the internal 3-space (internal volume) of the container with the environment surrounding the container.

BRIEF DESCRIPTION OF THE DRAWINGS

FIG. 7A is a perspective view of the folded polymer of FIG. 7 used in the fabrication of the article of FIG. 12.

FIG. 8A is a perspective view of the second folding (8 creases) of the cut out polymer of FIG. 8.

FIG. 8C is a top plan view (8 creases) of the cut out polymer shown in perspective in FIG. 8A cut out from the tube of FIG. 6.

DETAILED DESCRIPTION OF THE DRAWINGS

Figure 1:
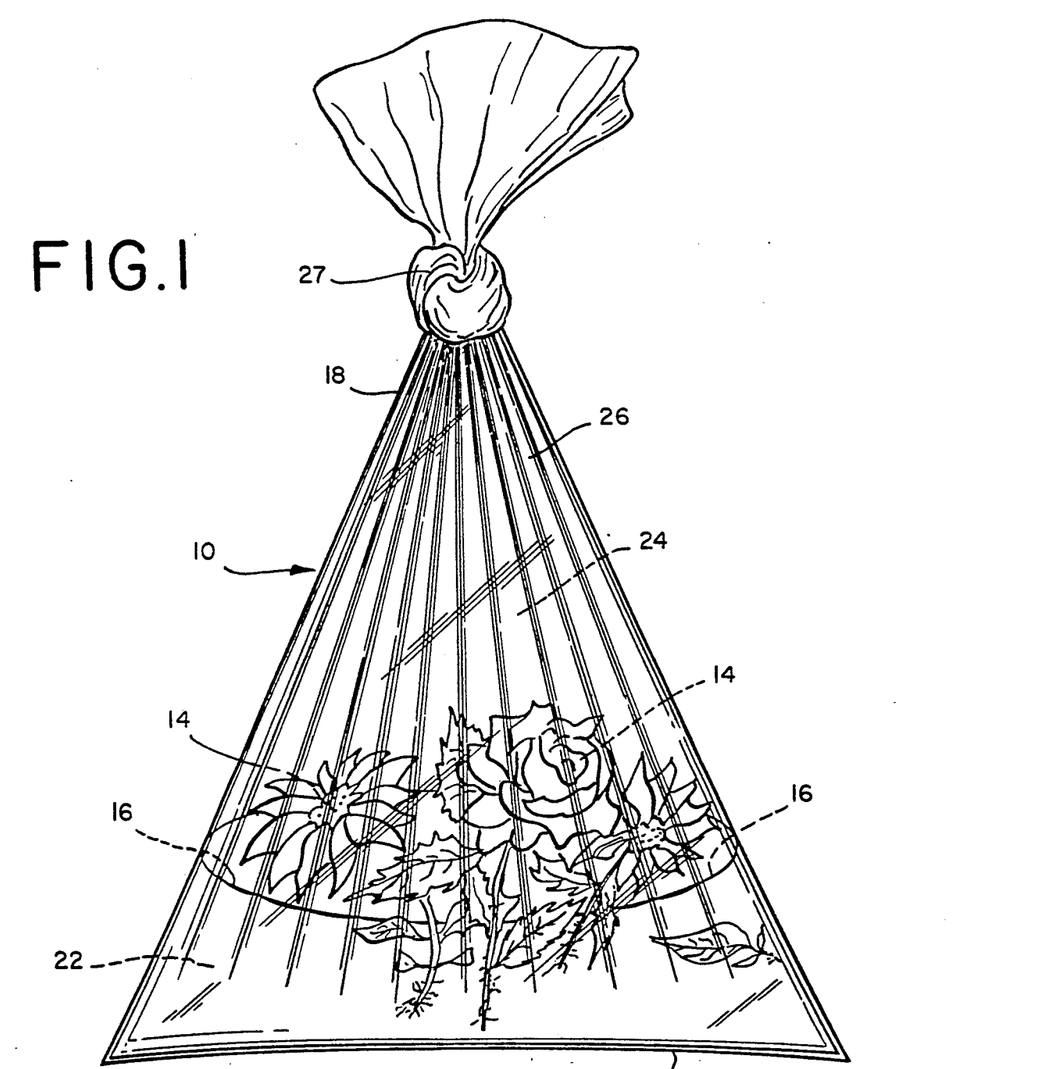
FIG. 1 is a perspective view of an air-tight flexible transparent conical-shaped container of my invention containing a number of living flowers immersed in aqueous suspension.
Figure 2:
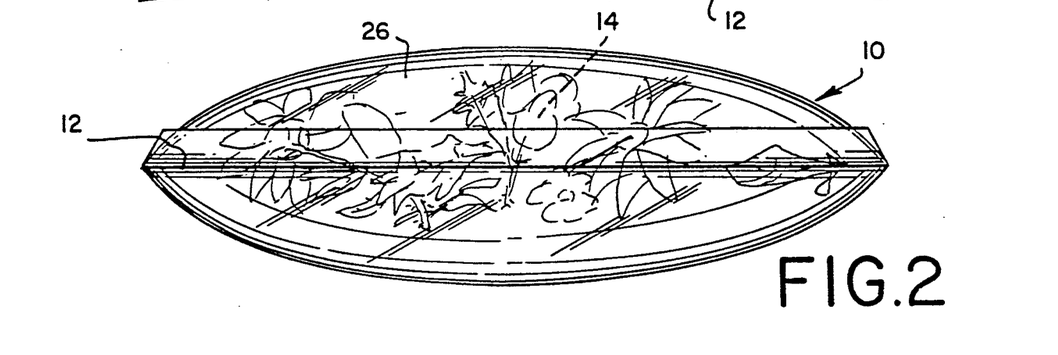
FIG. 2 is a bottom view of the article of FIG. 1.
Figure 3:
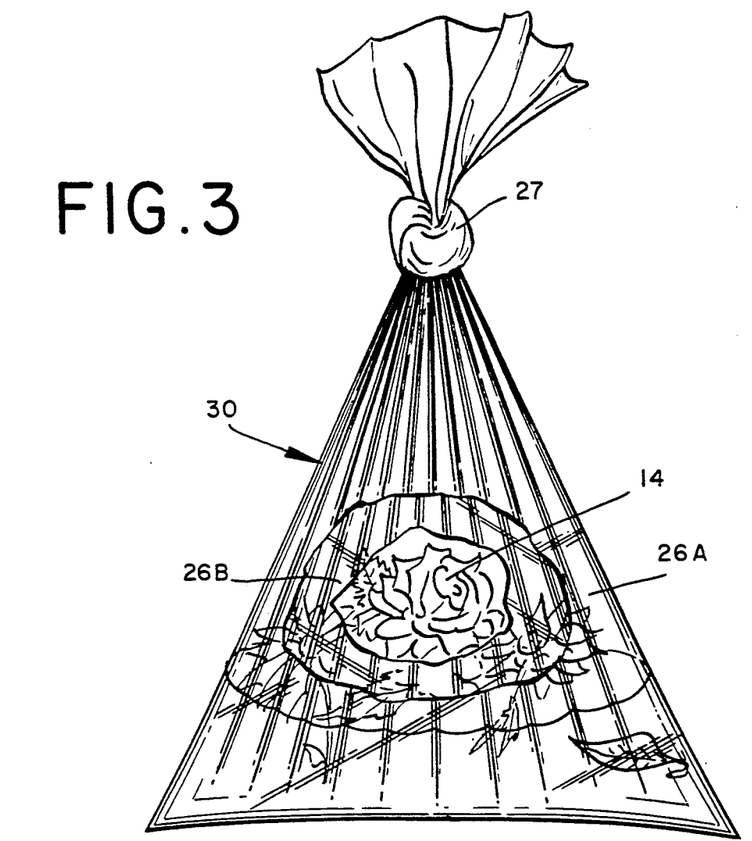
FIG. 3 is a partially cut-away perspective view of the article of FIG. 1 when the transparent container material from which the container is fabricated is in double layer mode.
Figure 4:
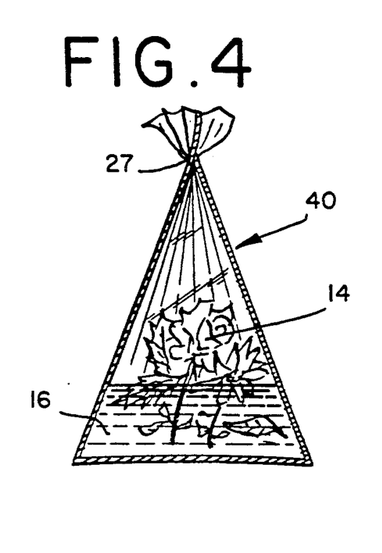
FIG. 4 is a cut-away side elevation view of another embodiment of the article of FIG. 3 using a single layer for the flexible transparent polymer from which said container is fabricated.
Figure 5:
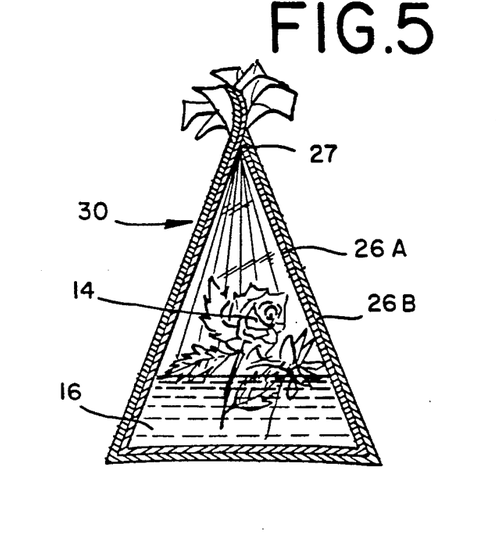
FIG. 5 is a cut-away side elevation view of the article of FIG. 3 showing the double layer construction of the container.
Figure 6:
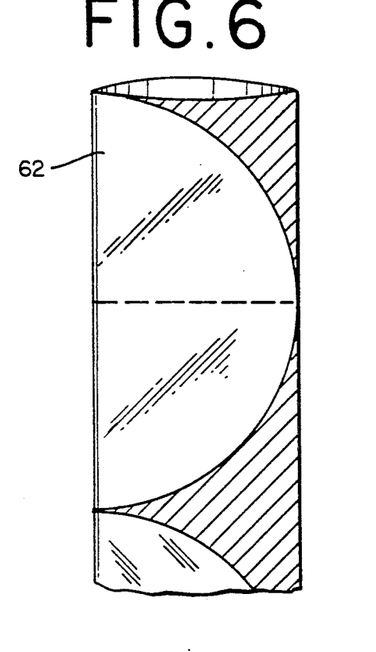
FIG. 6 is a perspective view of plastic tubing used in fabricating the container of FIG. 12.
Figure 7:
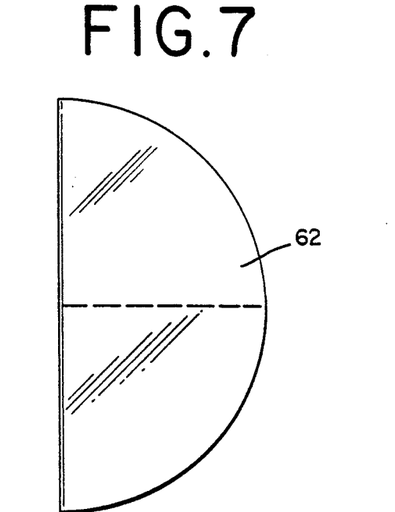
FIG. 7 is a side view of a first folding of polymer cut from the plastic tubing of FIG. 6 used in the fabrication of the article of FIG. 12.
Figure 8:
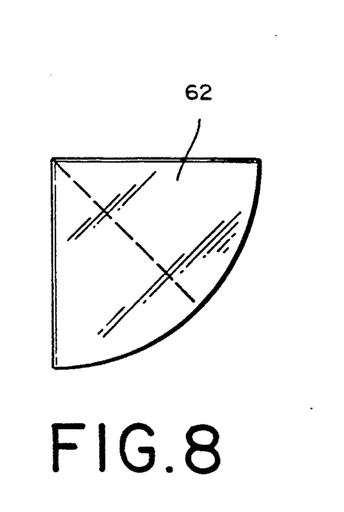
FIG. 8 is a top view of the second folding (8 creases) of the cut out polymer from the plastic tubing of FIG. 6 used in the fabrication of the non-collapsible container of FIG. 12.
Figures 8, 9, 10, 11, 12:
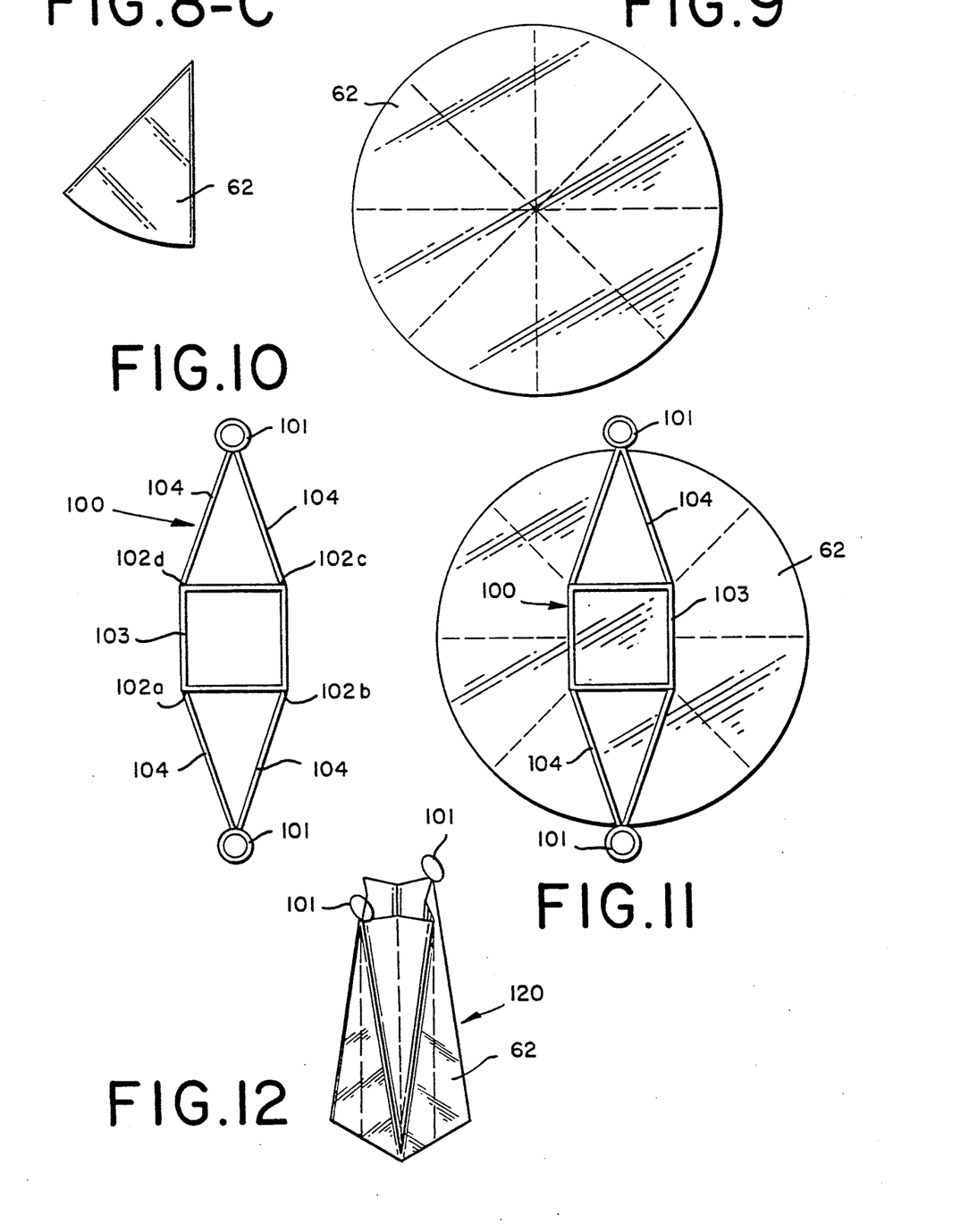
FIG. 12 is a perspective view of another embodiment of an air-tight flexible transparent container fabricated for containing at least one living flower immersed in aqueous suspension.
FIG. 9 is a bottom view of a circular article prepared from the polymer cut from the plastic tubing of FIG. 6.
FIG. 10 is a top view of a reenforcing structure for holding the article of FIG. 12.
FIG. 11 shows a top view of the reenforcing structure in place holding the article of FIG. 12.

Referring to FIG. 1, article 10 is a container for several living flowers 14 and the article consists of a vertically disposed air tight substantially flexible transparent enclosure having an internal 3-space 24; which is the head space above the liquid nutrient medium or water 22 containing the living flowers 14. The "head space" is the gaseous phase 24 above the surface of the liquid 16. The enclosure consists of a lower substantially horizontally disposed support surface 12 and a continuous side wall extending upwardly from the circumference of support 12, the side wall being indicated by reference numeral 26 in FIG. 1. Located within the 3-space and supported on the support surface is the aqueous medium which may be water or a nutrient medium, the aqueous medium again being indicated by reference numeral 22. Contained in the aqueous medium are the living flowers 14. The article 30 shown in FIGS. 3 and 5 has a double wall of polymer, e.g., polyethylene, polypropylene or polyester 26A and 26B (shown in FIG. 3). After placing the living flowers into the aqueous medium 22, the article can be sealed using a simple seal 27 (shown in FIG. 1) and the article can be supported from a horizontal support above the seal 27 and can remain suspended from said seal 27. The suspension system is shown in detail for article 120 (of FIG. 12) fabricated from a polymer 62. The article 120 shown in FIG. 12 may be suspended using a reenforcing structure 100 (shown in FIGS. 10 and 11). The reenforcing structure has hanging rings 101; hinges 102A, 102B, 102C and 102D; a supporting base 103 and reenforcing ribs 104. FIG. 11 shows the reenforcing structure welded to a transparent circular surface which in turn is fixedly adhered to article 120 shown in FIG. 12.

Figure 13:
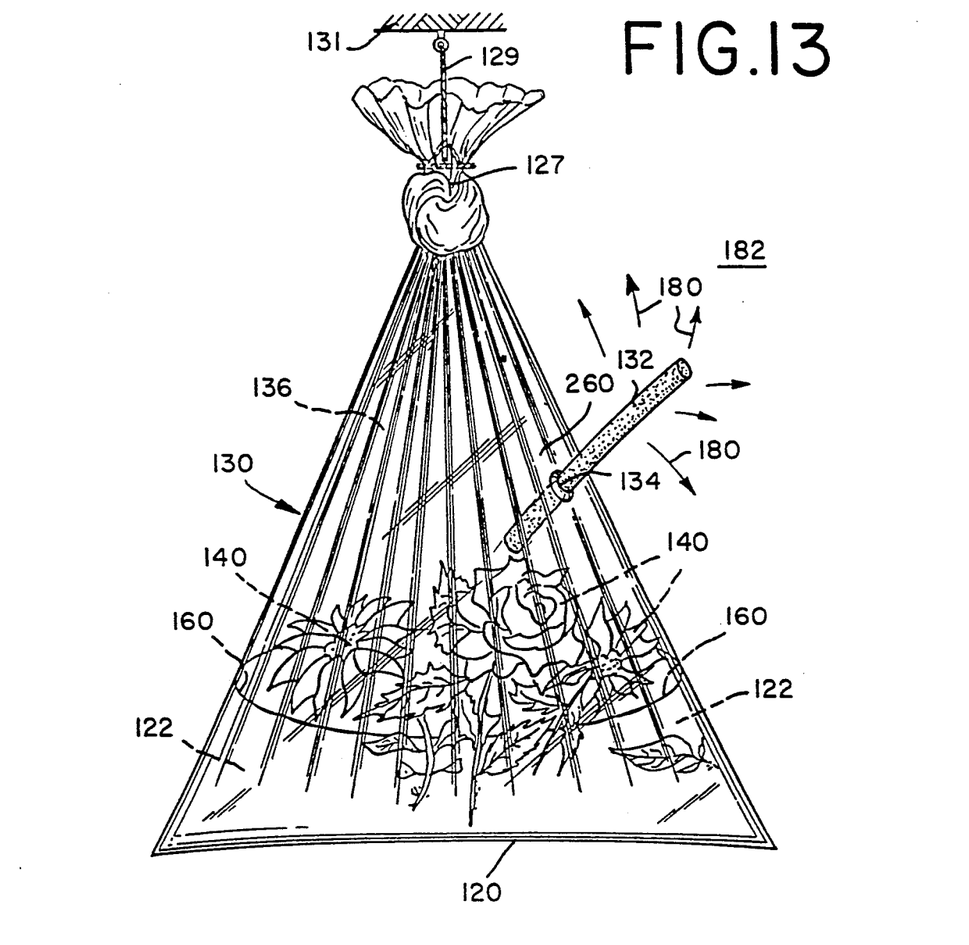
FIG. 13 is a cut-away side elevation view of an air-tight flexible transparent container containing several living flowers immersed in aqueous suspension and also having through one of its side walls a wick enabling the dissemination of aroma from the head space above the liquid medium into the atmosphere surrounding the article.
Figure 14:
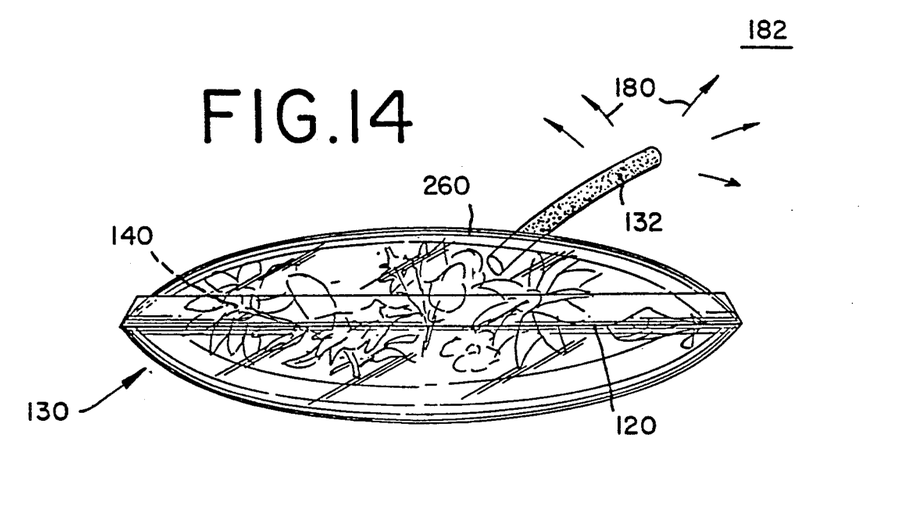
FIG. 14 is a bottom view of the article of FIG. 13 containing the wick.

Referring to FIG. 13, the air-tight flexible transparent container 130 contains living flowers 140 immersed in aqueous suspension 122 supported on a support 120. Container 130 has side wall 260. In side wall 260 is aperture 134 having a close fitting wick 132 (formed of, for example, polyurethane foam). Fragrance emitted from living flowers 140 evolves through wick 132 into the atmosphere or environment 182 surrounding article 130. The evolution of the perfume into the atmosphere is shown using arrows 180. The head space from which the fragrance is transmitted from the flowers 140 is indicated by reference numeral 136. Article 130 is supported from a beam 131 via suspension cable 129 attached to seal 127 of article 130.

Figure 15:
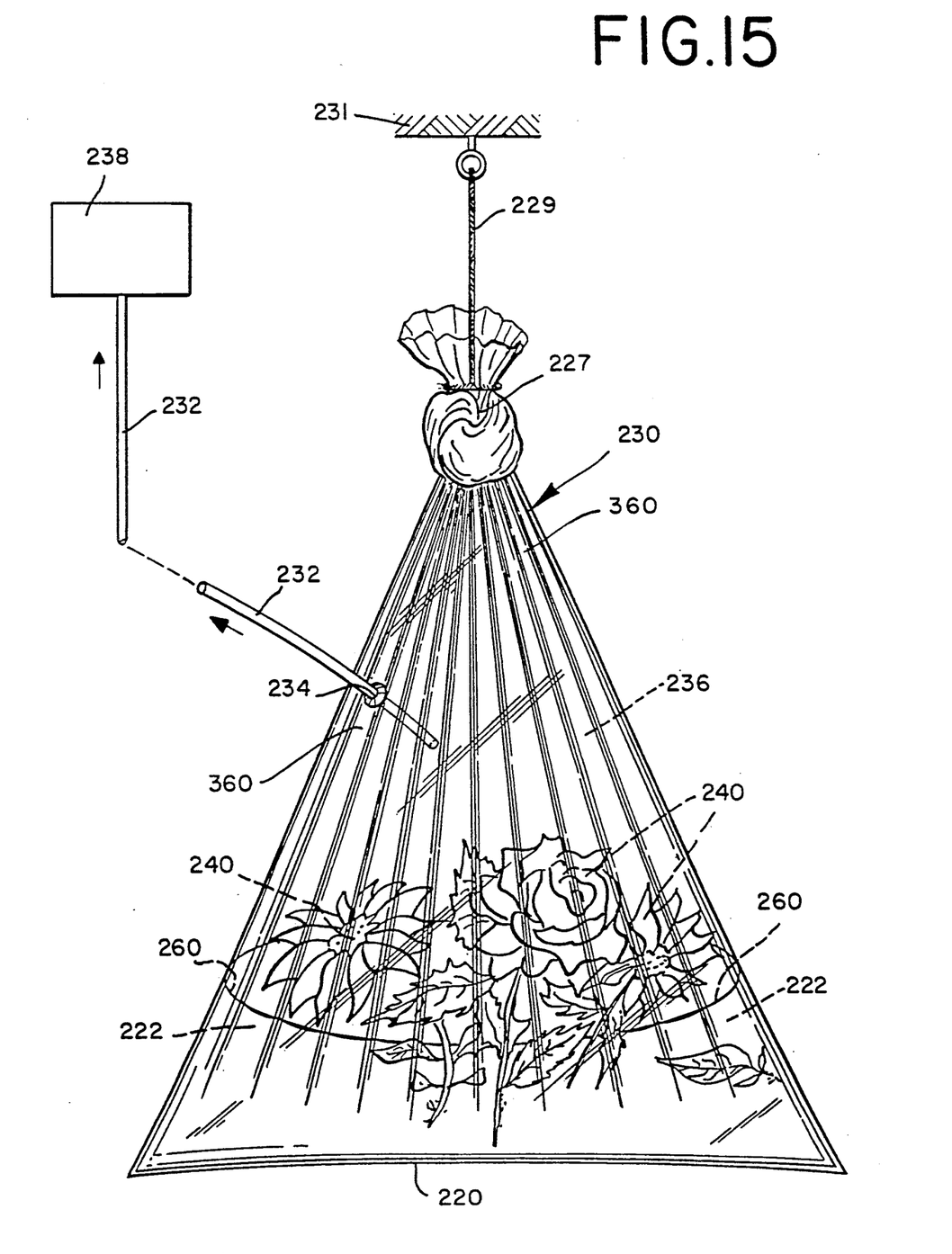
FIG. 15 is a cut-away side elevation view and schematic diagram of an air-tight flexible transparent container containing several living flowers immersed in aqueous suspension wherein a narrow tube is inserted into the head space above the liquid medium through a side wall of the article, with the narrow tube leading to an analytical system.

Referring to FIG. 15, FIG. 15 is another embodiment of an air-tight flexible transparent container containing living flowers 240 immersed in liquid 222 located on support 220. Above surface of liquid 260 is head space 236. Container 230 has side wall 360. Side wall 360 contains aperture 234 throughwhich is placed a narrow tube having an outside diameter equal to the diameter of aperture 234. The tube is indicated by reference numeral 232. Fragrance from flowers 240 is transmitted through head space 234 through tube 232 into analytical system 238 wherein the fragrance evolved from flowers 240 may be analyzed via GC mass spectral analysis and NMR analysis. Article 230 may be suspended from beam 231 via cable 229 which is attached to seal 227 which is the seal of the suspended transparent container 230.

Figure 16:
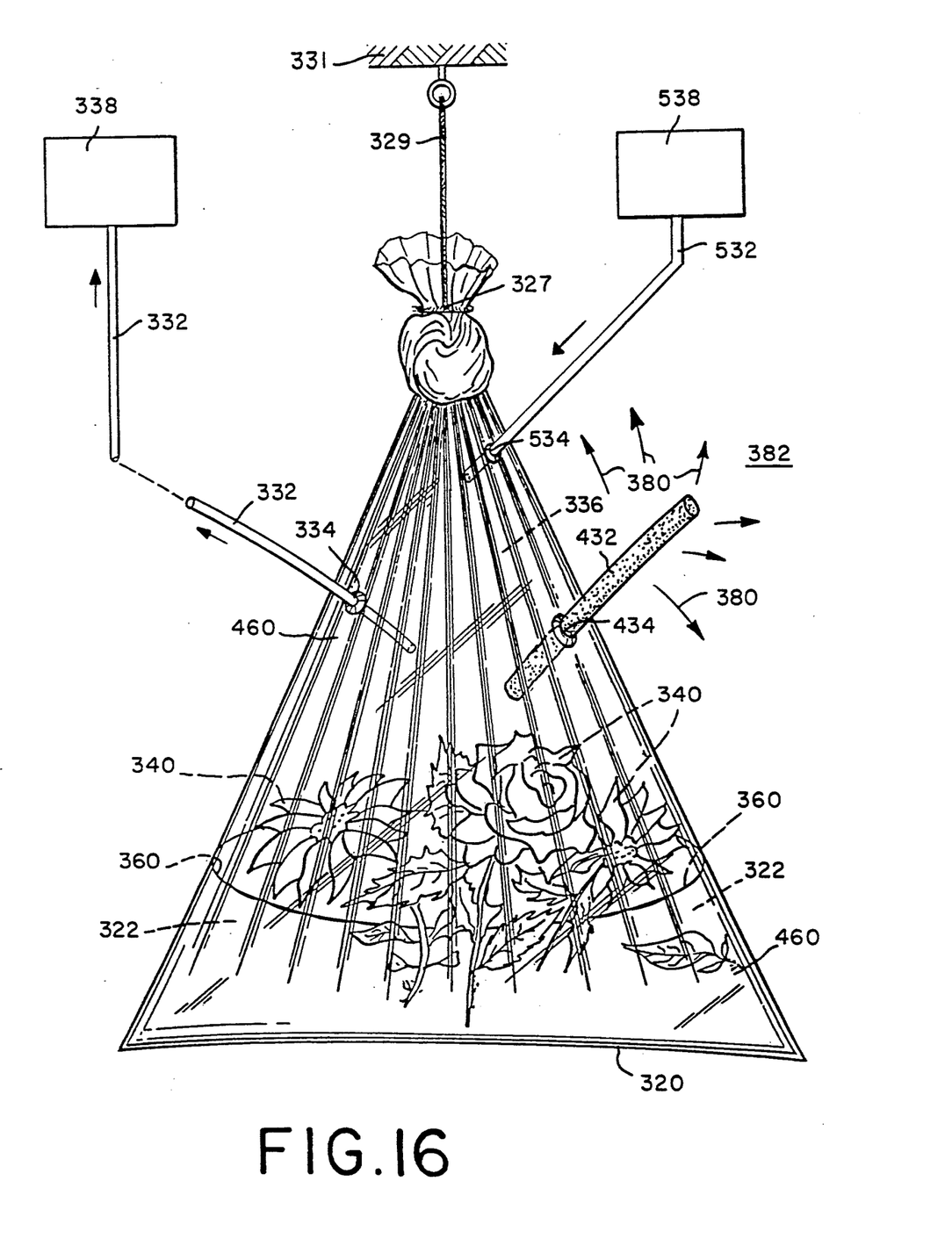
FIG. 16 is a cut-away side elevation view of another embodiment of an air-tight flexible transparent container containing at least one living flower immersed in an aqueous suspension of my invention; having inserted therein a tube communicating with an analytical instrument; a wick communicating with the atmosphere surrounding the article; and a water replenishment source means communicating with the head space within said article.

Referring to FIG. 16, FIG. 16 is a cut-away side elevation view of another embodiment of an air-tight flexible transparant container containing living flowers immersed in an aqueous suspension, the living flowers being indicated by reference numeral 340, the liquid suspension being indicated by reference numeral 322. The liquid suspension 322 is supported on the support section of the article and is indicated by reference numeral 320. The side walls of the article are indicated by reference numeral 460. Above the surface 360 of the aqueous suspension 322 is head space 336. The living flower(s) evolve fragrance into the head space 336 which is then simultaneously analyzed using analytical instrument 338 with the vapor flowing into the analytical instrument through tube 332 inserted in wall 460 through opening 334. Simultaneously, fragrance 380 is evolved into the environment surrounding the article 382 via wick 432 inserted into wall 460 through orifice 434. Simultaneously, water replenishment or liquid replenishment material from source 538 is dripped through tube 532 onto surface 360. The tube 532 is inserted into wall 460 (via an air-tight insertion) at orifice 534. The article of FIG. 16 is suspended from beam 331 by suspension means (or cable) 329 connected at closure 327 of the article. In this manner, the head space 336 can be analyzed at 338 and simultaneously be evolved into the atmosphere 382 surrounding the article through wick 432; and simultaneously the nutrient liquid or other type of aqueous suspension can be replenished from source 538 into liquid 322 which would be constantly evaporating via wick 432 and as a result of use of analytical instrumentation 338.

What is claimed is:

1. A fragrancing-analyzing apparatus consisting of (A) head space vapor analysis means and (B) a container located proximate said head space vapor analysis means for at least one living flower, said container consisting of a vertically-disposed air-tight substantially flexible transparent enclosure having an internal 3-dimensional volume, said enclosure consisting of (1) a lower transparent flexible substantially horizontally disposed support surface; and (2) a continuous transparent flexible side wall extending upwardly from the circumference of said support surface having at least two orifices therethrough; extending from said internal 3-dimensional volume through each of side orifices, vapor transmission means having a compressed external circumference substantially equal to and contiguous to the circumference of each of said orifices, capable of transmitting the head space volatiles of the living flowers from said 3-dimensional volume to a location proximate said article; at least one of said transmission means being a wick for transmitting the head space volatiles of the living flowers from said 3-dimensional volume to the environment surrounding said container; and at least one of said transmission means being a thin tube for transmitting the head space volatiles of the living flowers from said 3-dimensional volume to said head space vapor analysis means located proximate said container.

* * * * *